2,769,778

METHOD OF MAKING TRANSPARENT CONDUCTING FILMS BY CATHODE SPUTTERING

John Silvey Preston, Teddington, England, assignor to National Research Development Corporation, London, England, a corporation of Great Britain No Drawing. Application September 2, 1952, Serial No. 307,561

Claims priority, application Great Britain September 5, 1951

7 Claims. (Cl. 204—192)

The purpose of the present invention is to provide the surface of an electrical non-conductor with a thin, transparent electrically conductive film. As the methods of the invention involve heating it can only be applied to materials which will withstand the temperatures involved, which are of the order of up to 400° C. and such materials are herein referred to as heat-resisting. Examples of materials to which the methods can be applied are glass, glazed or unglazed ceramics, fused silica, and mica, but the invention is not limited to or by these examples.

Processes have already been proposed for producing thin, transparent electrically conductive films, according to which films of metal are applied to the supporting surface as by cathodic sputtering or thermal evaporation, the film being thin enough to be transparent; there is here a direct conflict between conductivity which calls for thickness and transparency which calls for thinness. Processes have also been proposed for producing from metallic salts, particularly halides, films which are at the same time both conductive and transparent. Conditions were proposed under which the final film was believed to be an oxide; thus, in the case of tungsten and molybdenum, for example, there were two stages, the first producing a film of a higher oxide, which in the second stage was reduced to a lower oxide, the final film though transparent being blue; in the case of tin it was proposed to expose a glass surface while hot to fumes of stannic chloride or stannous chloride or iodide in air, or to spray such a surface with a solution of stannous or stannic chloride or sulphate or of stannous nitrate, or even to apply solid stannous oxalate or stannous oxide to the hot surface, always in the presence of air. The final film was stated to analyse as stannic oxide, $SnO_2$ and to be electrically conductive.

Other processes for producing films of stannic oxide have also been proposed but no particulars of the electrical conductivity of the film were given. As stannic oxide itself has such a high electrical resistance as to be regarded as an insulator, in the absence of specific statements to the contrary it must be assumed that these other processes did not produce electrically conductive films.

The present invention produces a final film which as far as we are aware is of fully oxidised tin or indium, which is electrically conductive as well as being transparent. It is moreover produced from a metallic starting material and not from a salt or oxide.

According to the invention, a thin coating, as uniform as may be, derived from metallic tin or indium, preferably of high purity, is deposited on the supporting surface by cathode sputtering in the presence of oxygen insufficient in concentration to oxidise the metal completely, and the coated surface is thereafter heated under oxidising conditions substantially to complete the oxidation of the coating. By these means, a transparent electrically conductive film can be produced.

The use of cathode sputtering to produce the coating in itself imposes certain limitations on the possible shape of the surface to be coated as will be understood by those skilled in the art.

Cathode sputtering requires a certain low pressure atmosphere to sustain the electric discharge; the concentration of oxygen required in the first stage of the present process is much below the total pressure requisite for sustaining the discharge and the main part of atmosphere during sputtering is therefore made up of a gas inert to the metal, advantageously argon, with a suitable admixture of oxygen which can conveniently be provided by an admixture of air in an amount which would in the ordinary way be described as a mere trace; the nitrogen introduced in this way though possibly not inert does not appear to affect the process one way or the other. The total pressure of the atmosphere during sputtering may be of the order of 0.05 mm. of the mercury column, and the pressure of oxygen is most simply determined by trial, as it is found that the conductivity of the film after the subsequent heating can be judged by the colour of the coating produced in the sputtering stage, and that the colour depends on the pressure of oxygen during this operation.

The approximate colour is between pale yellow and brown and is not highly critical; it appears to correspond to a proportion of oxygen in the coating somewhat lower than would correspond to the lower oxide of the metal. If the colour obtained is not correct the presence of oxygen in the sputtering apparatus is adjusted accordingly as will be explained in greater detail below.

To obtain the lowest resistance of the film, the temperature to which the coated surface is heated in the second stage should be in the range of 300° to 400° C., the preferred temperature being 350° and a few minutes heating suffices. Other things being equal, the resistance of the film can be increased by prolonging the heating or carrying it to a higher temperature. The heating can conveniently be carried out in air.

During the heating the colour of the film disappears except for the iridescent colours inevitable in thin films of transparent substances and which depend on the so-called optical thickness. Also the film becomes electrically conductive and transparent. By transparent is meant that the film is substantially colourless and absorbs substantially no light; it does reflect light but the proportion reflected is small. The film is mechanically hard and inseparable from the supporting surface and is resistant to ordinary chemical agents. The uniformity of the film depends on the uniformity of the initial coating and of the subsequent heating, but a high degree of uniformity is easily attained in both these steps, resulting in a final film of corresponding quality, free from visible blemishes or unevenness.

The value of the electrical conductivity attained is dependent on the species and thickness of the deposited coating, the colour attained in the initial deposition, and the rate and intensity of heating. By controlling these various factors the conductivity can be varied and the process gives conductivities of the order suitable for the purposes given below by way of example.

A suitable atmosphere for the sputtering operation can be obtained by charging the sputtering apparatus in an atmosphere of air and washing out with argon before evacuating. The proportion of air thereby left in the atmosphere in the apparatus and evolved under the action of the evacuating pumps and the heating of the cathode occurring during sputtering, usually suffices to obtain the desired results. Alternatively, the apparatus may be thoroughly evacuated and degassed and air be admitted by a needle valve. The product of the first run or two may not be satisfactory owing to the cathode not having become sufficiently heated; thereafter a succession of successful runs can often be obtained without any change in the way the operations are carried out, but this depends on the apparatus used, for instance, whether or not the cathode is water-cooled, the size and nature of the internal surface of the apparatus in which the sputtering is performed, but in general no difficulty is found in reaching satisfactory conditions which enable a series of articles to be treated in succession. As above-mentioned, the colour of the coating forms a simple and reliable guide, and the apparatus may be provided with a glass window or the like to enable this to be watched during the operation. The actual time of sputtering will, of course, depend on the thickness of film desired.

By way of specific example of the invention, a pale brown coating $5.10^{-6}$ cm. thick derived from tin of high purity may be deposited by cathode sputtering in an atmosphere of argon containing a trace of air, at a pressure of 0.05 mm., on ordinary glass (photographic plate or bottle glass) and heated for 5 minutes at 350° C. After cooling the film is found to have a resistance of 500 to 1,000 ohms between opposite edges of a square sample; the light adsorption of the film is negligible and it is substantially colourless.

Surface treatment of the film may affect the conductivity, generally in a temporary fashion. Thus rubbing with a dry cloth or washing with water will usually increase the conductivity, but after a lapse of time, of the order of 24 hours the conductivity may revert to the original value.

By way of example the conductive films produced by the invention are useful (if transparent and free from visible blemishes) on the glass windows of electrical or other indicating instruments to avoid the accumulation of static charges thereon when they are cleaned in dry weather and which by attracting the pointer may lead to false readings. They may also be used to heat glass windows or screens electrically to prevent deposition of moisture or ice for example and to heat microscope slides during the examination of biological specimens which need to be kept warm. Another use is to make the whole surface of such high tension insulators as have a shape enabling them to be coated by cathode sputtering slightly more or less uniformly conducting to avoid the risk of breakdown or flash-over in the event of uneven condensation or moisture or similar condition which would otherwise cause localised concentration of the electric field. For this purpose the conductivity of the film should be as high as such considerations as loss of power or overheating will permit. Yet another use is the production of a fixed resistance or a simple variable resistance. In the latter case one contact would be fixed to the end of a strip of film and the other arranged so that it can be slid along the film; resistances of this character are used in electronic circuits, for instance as volume controls.

I claim:

1. The method of providing a surface of an article of heat resisting material with a thin electrically conductive film which comprises depositing on the surface by cathode sputtering, in the presence of oxygen insufficient in concentration to oxidise the metal completely, a thin yellow-to-brown coating, as uniform as may be, derived from a metal selected from the group consisting of metallic tin and metallic indium, and thereafter heating the coated surface under oxidising conditions until it becomes substantially transparent.

2. A method as set forth in claim 1 in which the oxygen is present during sputtering as a small admixture in a gas inert to the metal.

3. A method as set forth in claim 1 in which the subsequent heating is effected in air.

4. A method as set forth in claim 1 in which the oxygen is present during sputtering as a small admixture of air in argon and the subsequent heating is effected in air.

5. The method of providing a surface of an article of heat-resisting material with a thin transparent electrically conductive film which comprises depositing on the surface by cathode sputtering in the presence of argon containing a trace of air, a thin yellow to brown coating derived from metallic tin or high purity, and thereafter heating the coated surface in air until it becomes substantially transparent.

6. A method according to claim 5 in which the article is of glass.

7. An article of heat-resisting material having on a surface thereof a thin transparent electrically conductive film consisting substantially of stannic oxide being halogen-free and in the condition produced by applying to the surface of the article a yellow to brown coating derived by cathode sputtering from tin of high purity in the presence of an inert gas containing a trace of oxygen and thereafter heating the coating under oxidising conditions until it becomes substantially transparent.

References Cited in the file of this patent

UNITED STATES PATENTS

| 2,429,420 | McMaster | Oct. 21, 1947 |
| 2,516,663 | Zunick | July 25, 1950 |

OTHER REFERENCES

Overbeck: Jour. Optical Soc. of America, vol. 23, March 1933, pp. 109 to 113.

Nathanson et al.: Jour. Optical Soc. of America, vol. 29, 1939, pp. 417 to 426.